US012179915B2

(12) United States Patent
Walega et al.

(10) Patent No.: US 12,179,915 B2
(45) Date of Patent: Dec. 31, 2024

(54) AIRCRAFT WING WITH WING TIP SEAL PANEL ASSEMBLY

(71) Applicant: AIRBUS OPERATIONS LIMITED, Bristol (GB)

(72) Inventors: Janusz Walega, Bristol (GB); Matt Harding, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 35 days.

(21) Appl. No.: 18/105,627

(22) Filed: Feb. 3, 2023

(65) Prior Publication Data
US 2023/0257099 A1 Aug. 17, 2023

(30) Foreign Application Priority Data
Feb. 11, 2022 (GB) ...................................... 2201786

(51) Int. Cl.
*B64C 3/56* (2006.01)
*B64C 3/26* (2006.01)
*B64C 7/00* (2006.01)

(52) U.S. Cl.
CPC .................. *B64C 3/26* (2013.01); *B64C 3/56* (2013.01); *B64C 7/00* (2013.01)

(58) Field of Classification Search
CPC .. B64C 3/56; B64C 3/546; B64C 3/42; B64C 23/072
See application file for complete search history.

(56) References Cited

U.S. PATENT DOCUMENTS

| 4,691,880 A * | 9/1987 | Frank | F42B 10/16 244/49 |
| 5,372,336 A * | 12/1994 | Paez | B64C 3/56 244/49 |
| 8,210,473 B2 * | 7/2012 | Schweighart | B64C 3/56 244/99.2 |

(Continued)

FOREIGN PATENT DOCUMENTS

| CN | 107972847 | 5/2018 |
| CN | 112478133 | 3/2021 |

(Continued)

OTHER PUBLICATIONS

UKIPO Search and Examination Report cited in GB2201786.7, mailed Jul. 12, 2022, 4 pages.
EP Search Report in EP 23 15 4209 (Jun. 13, 2023)(6 pagtes).

*Primary Examiner* — Richard Green
(74) *Attorney, Agent, or Firm* — Nixon & Vanderhye P.C.

(57) ABSTRACT

An aircraft wing including: a main wing portion with a tip end, and a wing tip device rotatably coupled to the tip end of the main wing portion at a joint, the wing tip device rotatable at the joint about a first axis between a flight configuration and a ground configuration; and a seal panel assembly including: a seal panel extending across the joint; a first connecting element having a first end non-rotatably coupled to the seal panel and a second end rotatably coupled to the main wing portion such that the seal panel is rotatable about a second axis; and a second connecting element having a first end rotatably coupled to the seal panel and a second end rotatably coupled to the wing tip device, such that rotation of the wing tip device about the first axis causes the seal panel to rotate about the second axis.

16 Claims, 9 Drawing Sheets

(56) References Cited

U.S. PATENT DOCUMENTS

| | | | |
|---|---|---|---|
| 9,415,857 B2 * | 8/2016 | Fox | B64C 3/56 |
| 11,591,066 B1 * | 2/2023 | Rawdon | B64C 3/56 |
| 2014/0117151 A1 | 5/2014 | Fox et al. | |

FOREIGN PATENT DOCUMENTS

| | | | | |
|---|---|---|---|---|
| GB | 2584409 | | 12/2020 | |
| GB | 2584409 A | * | 12/2020 | B64C 3/38 |
| WO | 2020/229630 | | 11/2020 | |

* cited by examiner

AIRCRAFT WING WITH WING TIP SEAL PANEL ASSEMBLY

RELATED APPLICATION

This application incorporates by reference and claims priority to United Kingdom patent application GB 2201786.7, filed Feb. 11, 2022.

TECHNICAL FIELD

The present invention relates to an aircraft wing comprising a seal panel assembly, and an aircraft comprising the aircraft wing.

BACKGROUND

There is an increasing trend to increase the wing span of aircraft, however there are many limiting factors such as meeting restrictions related to the size of taxiways, runways and terminal gates. One way of tackling these restrictions is to provide folding wing tips, where a wing tip device is moveable between a flight configuration for use during flight and a ground configuration for use during ground manoeuvres.

It is desirable to effectively cover the joint between the main wing portion and wing tip device, however existing solution are often complex to avoid clashing of the relevant structures whilst providing an aerodynamic profile in the flight configuration. Consequently, there is a need to cover the folding wing tip mechanism simply and effectively.

SUMMARY

A first aspect of the invention provides an aircraft wing comprising: a main wing portion with a tip end, and a wing tip device rotatably coupled to the tip end of the main wing portion at a joint, the wing tip device rotatable at the joint about a first axis between a flight configuration and a ground configuration; and a seal panel assembly, comprising: a seal panel extending across the joint; a first connecting element having a first end non-rotatably coupled to the seal panel and a second end rotatably coupled to the main wing portion such that the seal panel is rotatable about a second axis; and a second connecting element having a first end rotatably coupled to the seal panel and a second end rotatably coupled to the wing tip device, such that rotation of the wing tip device about the first axis causes the seal panel to rotate about the second axis.

With this arrangement, a simple mechanism for moving a seal panel is provided. The seal panel assembly is passively driven, and the seal panel rotates about a single axis. The seal panel is well placed during all stages of deployment (flight configuration, intermediate configuration and ground configuration) to cover the joint, or parts of the joint, beneath the seal panel. A single panel is about to cover the joint at all stages of deployment.

The first axis and the second axis may be substantially parallel. The seal panel and wing tip device may be configured to rotate in the same direction.

The second end of the first connecting element may be inboard of the seal panel. This assist in avoiding clashing of the seal panel with main wing portion during extended rotational range of the wing tip device.

The first connecting element may comprise a first arm portion and a second arm portion that meet at an elbow. This assists in avoiding a clash of the first connecting element with parts of the existing aircraft wing structure, such as the leading and/or trailing edge panels that may extend over a portion of the seal panel assembly.

A central axis of the first arm portion may extend at an angle less than 135 degrees with respect to a central axis of the second arm portion. A central axis of the first arm portion may extend at an angle less than 100 degrees with respect to a central axis of the second arm portion.

The seal panel may comprise a side panel having a face portion substantially perpendicular to the first axis, the side panel configured to extend over at least a portion of the first and second connecting elements in the ground configuration. This arrangement may provide additional coverage and protection to the connecting elements, the joint, or to other parts extending through the joint such as electrical harnesses.

An inboard edge of the side panel may be arcuate. This may allow the inboard edge to substantially conform to the respective outboard edge of the main wing portion, such that the gap between the side panel and main wing portion is minimised.

The side panel may be a first side panel located towards a first end of the joint, and the seal panel may comprise a second side panel located towards a second end of the joint. This assists in protecting from the leading and trailing edge directions of the wing.

The first connecting element and second connecting element may be located between the first and second side panels. This arranged protects the first and second connecting elements.

The seal panel may have a perimeter edge, and substantially the entire perimeter edge may be adjacent one of an outer skin of the main wing portion and an outer skin of the wing tip device in the flight configuration. This ensures the aerodynamic profile of the wing.

The aircraft wing may further comprise a seal for sealing between the seal panel and the surrounding structure of the main wing portion and the wing tip device in the flight configuration, wherein the seal extends along substantially the entire perimeter of the seal panel.

The aircraft wing may further comprise a power system extending across the joint at a chordwise position, wherein the seal panel assembly is located at a chordwise position of the power system extending across the joint such that the seal panel is arranged to cover the power systems. With this arrangement, the seal panel may provide access to the power system.

The main wing portion may be rotatable coupled to the wing tip device by a plurality of lugs. The seal panel assembly may be located at a chordwise position of the lugs such that the seal panel is arranged to cover the plurality of lugs. With this arrangement, the seal panel may provide access to the lugs.

The seal panel assembly may be a first seal panel assembly arranged to cover a first portion of the joint, and the aircraft wing may comprise a second seal panel assembly arranged to cover a second portion of the joint.

The seal panel may extend across the joint on an upper surface of the aircraft wing.

A further aspect of the invention provides an aircraft comprising the aircraft wing of the first aspect.

Unless stated otherwise, the term 'substantially' is intended to refer to deviations due to manufacturing tolerances and the like.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
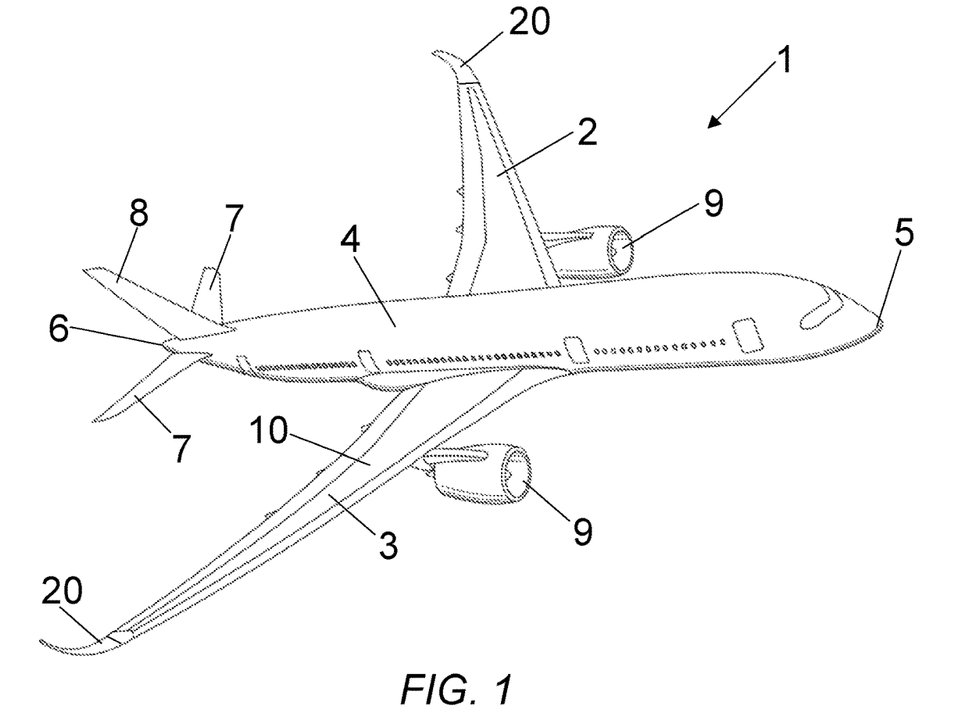
FIG. 1 shows an aircraft.

FIG. 1 illustrates a typical fixed wing aircraft 1. The aircraft 1 may have a port wing 2 and a starboard wing 3 that extend from a fuselage 4. Each wing 2, 3 may carry wing mounted engines 9. The fuselage 4 has a nose 5 and a tail 6. The tail 6 may have horizontal and vertical stabiliser surfaces 7, 8. The aircraft 1 may be a typical jet passenger transport aircraft although the invention is applicable to a wide variety of fixed wing aircraft types, including commercial, military, passenger, cargo, jet, propeller, general aviation, etc. with any number of engines attached to the wings 2, 3 or fuselage 4.

Each wing 2, 3 of the aircraft 1 may have a main wing portion 10 that is a cantilevered structure with a length extending in a span-wise direction from a wing root to a wing tip, the root being joined to the aircraft fuselage 4. A wing tip device 20 may be provided on the tip end of each wing 2, 3. The wings 2, 3 are similar in construction so only the port wing 2 will be described in detail with reference to FIG. 2.

Figure 2:
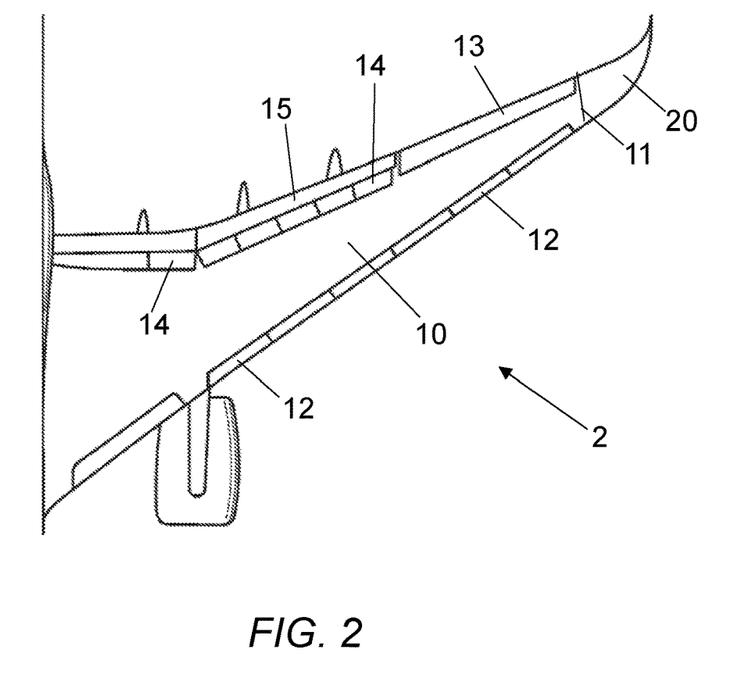
FIG. 2 shows a starboard wing of the aircraft.

The wing 2 may have a plurality of flight control surfaces, including slats 12, ailerons 13, air brakes/spoilers 14, and flaps 15. Whilst the aircraft 1 is shown with a particular quantity and configuration of control surfaces, it will be understood that the wing 2 may comprise a different number and/or arrangement of control surfaces.

The wing tip device 20 is a folding wing tip device 20 configured to rotate relative to the wing 2 at a joint 11 about a first axis. The joint 11 may extend from a leading edge to a trailing edge of the wing 2. The joint 11 may be considered to extend generally chordwise, where the chord of the wing 2 is a line extending between the leading edge and trailing edge of the wing 2. The first axis may be substantially parallel to a longitudinal axis of the aircraft 1 extending from the nose 5 to the tail 6. Alternatively, the first axis may be angled with respect to the longitudinal axis of the aircraft 1, for example within 30 degrees of the longitudinal axis and preferably within 10 degrees of the longitudinal axis. The folding wing tip device 20 may be rotated relative to the wing 2 by an actuator (not shown).

In this way, the wing tip device 20 is rotatable about the first axis between: (i) a flight configuration for use during flight (See, e.g., FIGS. 3 and 4) and (ii) a ground configuration for use during ground-based operations such as airport taxiing (See, e.g., FIGS. 5 and 6).

Figure 3:
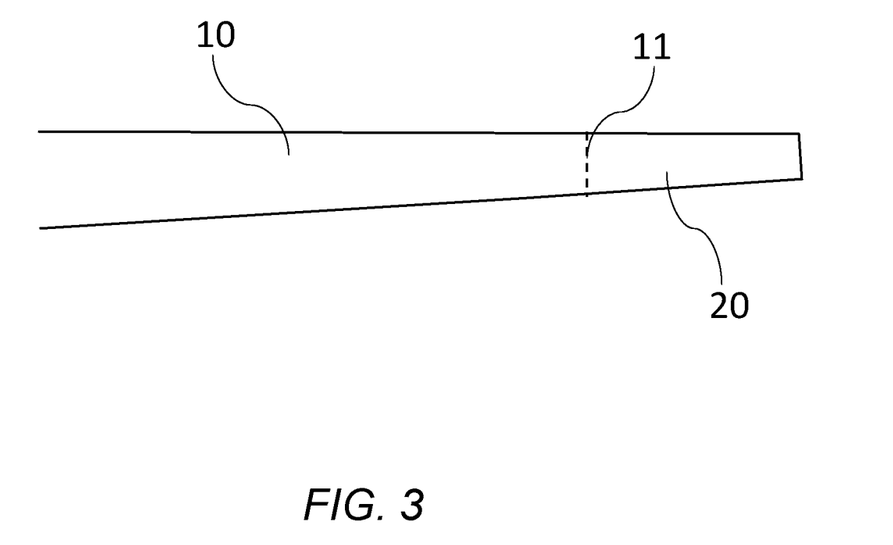
FIG. 3 shows a schematic view of a folding aircraft wing in a flight configuration.
Figure 4:
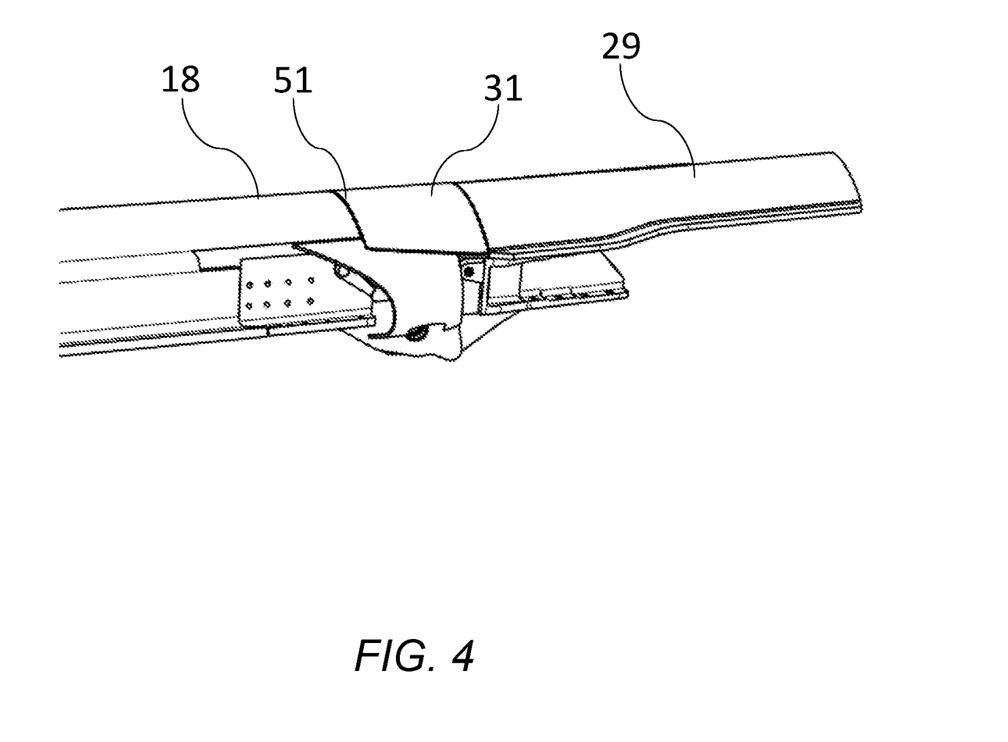
FIG. 4 shows the folding aircraft wing in a flight configuration with a seal panel extending across the joint of the folding aircraft wing.

In the flight configuration, the wing tip device 20 extends outwardly and typically extends so as to maximise the wing span of the aircraft 1. As such, an upper surface of the main wing portion 10 may abut or be adjacent an upper surface of the wing tip device 20. Similarly, a lower surface of the main wing portion 10 may abut or be adjacent a lower surface of the wing tip device 20.

Figure 5:
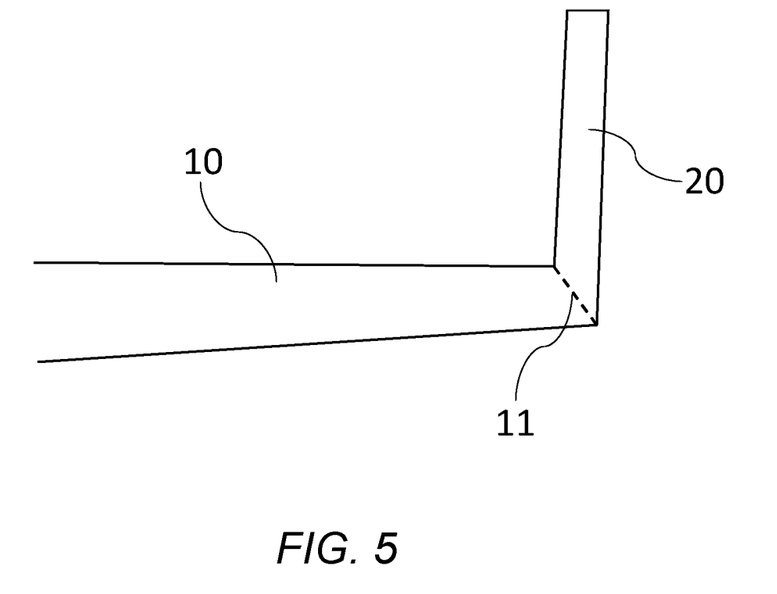
FIG. 5 shows a schematic view of the folding aircraft wing in a ground configuration.
Figure 6:
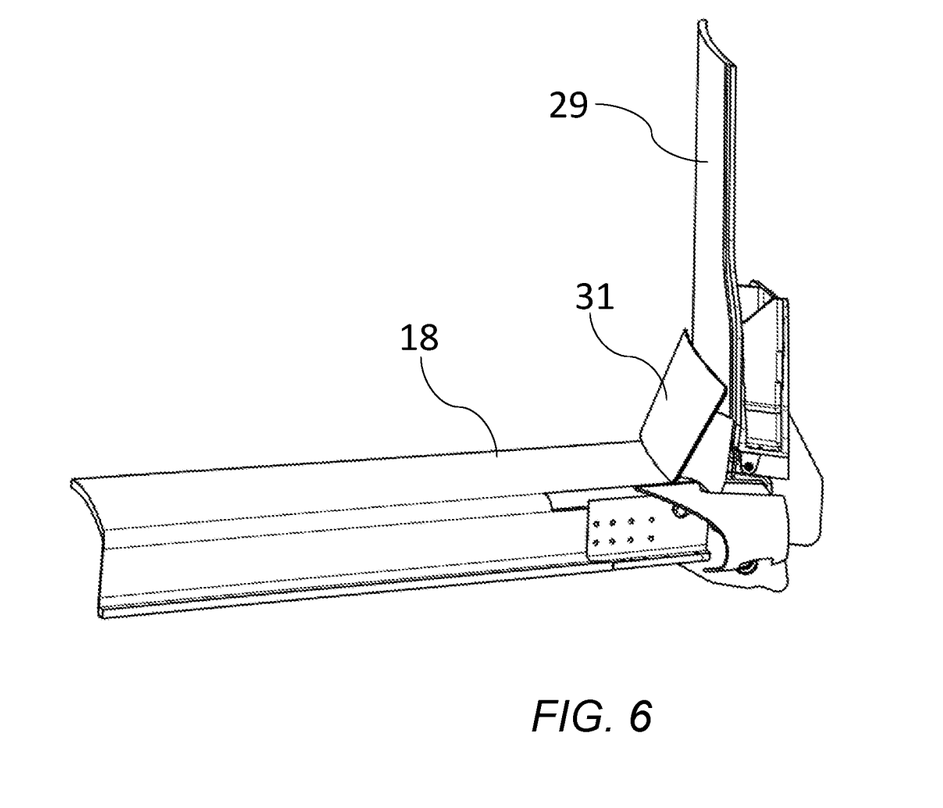
FIG. 6 shows the folding aircraft wing in a ground configuration with a seal panel of a seal panel assembly extending across the joint.

In the ground configuration, the wing tip device 20 may extend upwardly, away from the flight configuration, such that the span of the aircraft wing 2 is reduced, although in alternative examples the wing tip device 20 may extend downwardly.

As shown in FIGS. 5 and 6, the wing tip device 20 typically extends upwardly at an angle of substantially 90 degrees in the ground configuration, although it will be appreciated that the wing tip device 20 may extend up to any suitable angle, e.g. any angle between 45 degrees and 135 degrees.

It should be noted that FIGS. 4 and 6 show a view of part of the aircraft wing 2 in which the majority of the leading edge panels of the wing 2 are removed and only a single leading edge panel 25 of the main wing portion 10 is shown. The lower cover of the main wing portion 10 and wing tip device 20 are similarly removed.

A seal panel 31 extends across the joint 11, as shown in FIG. 4 in the flight configuration and in FIG. 6 in the ground configuration. The seal panel 31 may be substantially rigid. The seal panel 31 may be formed of any suitable material, e.g. aluminium, glass fibre reinforced composite, or carbon fibre reinforced composite.

The seal panel 31 is arranged to cover the joint at all stages of deployment between the flight configuration and ground configuration, as will be described below, thereby protecting the joint 11. The seal panel 31 has a perimeter edge, and as shown in FIG. 4, substantially the entire perimeter edge may abut or be adjacent the upper cover 18 of the main wing portion 10 and an upper cover 29 of the wing tip device 20. In this way, the seal panel 31 may fit flush with the surrounding upper cover 18, 29 of the aircraft wing 2 when in the flight configuration. This allows a smooth aerodynamic profile to be formed. In some examples, there may be a seal 51 for sealing the seal panel 31 with the surrounding structure of the main wing portion 10 and the wing tip device 20 in the flight configuration. The seal 51 may extend along substantially the entire perimeter of the seal panel 31.

The lower and upper covers 18, 29 may form part of the outer skin of the aircraft 1.

Figure 7:
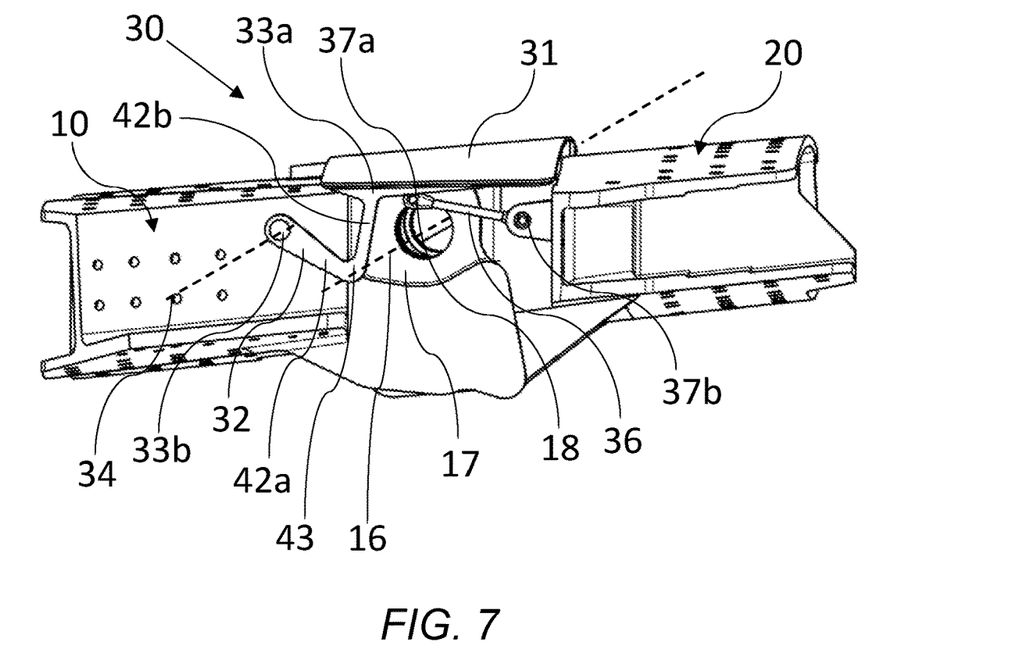
FIGS. 7 and 8 show the seal panel assembly of the aircraft wing in a flight configuration.

FIG. 7 shows an example of the joint 11 between the main wing portion 10 and the wing tip device 20. The joint 11 includes a first axis 16 about which the wing tip device 20 is configured to rotate relative to the wing 2.

The joint 11 includes a series of interleaving lugs 17 (only one of which is shown in FIG. 7). The lugs 17 each include a first pin hole 18 through which a pin (not shown) extends, and which defines the first axis 16 about which the wing tip device 20 rotates. The lugs 17 may also include a second pin hole for receiving a locking pin (not shown) for fixing the wing tip device 20 in the flight configuration.

The seal panel 31 extends across the joint 11 and is passively moved between a flight configuration and a ground configuration as the wing tip device 20 moves between the flight configuration and the ground configuration.

The seal panel 31 is part of a seal panel assembly 30. The seal panel assembly 30 comprises a first connecting element 32 having a first end 33a non-rotatably coupled to the seal panel 31 and a second end 33b rotatably coupled to the main wing portion 10 such that the seal panel 31 is rotatable about a second axis 34 (i.e. the second end 33b is pivotally coupled to the main wing portion 10). The second axis 34 may be substantially parallel to the first axis 16, although offset from the first axis 16. In this way, the seal panel 31 has a constant and pre-defined arc of travel about the second end 33b of the first connecting element 32. The seal panel 31 has a single axis of rotation.

The seal panel assembly 30 includes a second connecting element 36 having a first end 37a rotatably coupled to the seal panel 31 and a second end 37b rotatably coupled to the wing tip device 20. It will be appreciated that the second connecting element 36 may be directly or indirectly coupled to the seal panel 31, i.e. due to the first end 33a of the first connecting element 32 being non-rotatably coupled to the seal panel 31, the first end 37a of the second connecting element 36 may be rotatably coupled to the first connecting element 32 such that the first end 37a of the second connecting element 36 is indirectly coupled to the seal panel 31 via the first connecting element 32.

The seal panel assembly 30 is such that rotation of the wing tip device 20 about the first axis 16 causes the seal panel 31 to rotate about the second axis 34. In this way, the seal panel assembly 30 may be considered a slave mechanism passively driven by the actuator that folds the wing 2.

The seal panel assembly 30 may comprise multiple first and second connecting elements 32, 36, such as two, three or more. This may assist in supporting the seal panel 31.

The actuation of the seal panel assembly 30 will now be described with reference to FIGS. 7 to 12.

Figure 8:
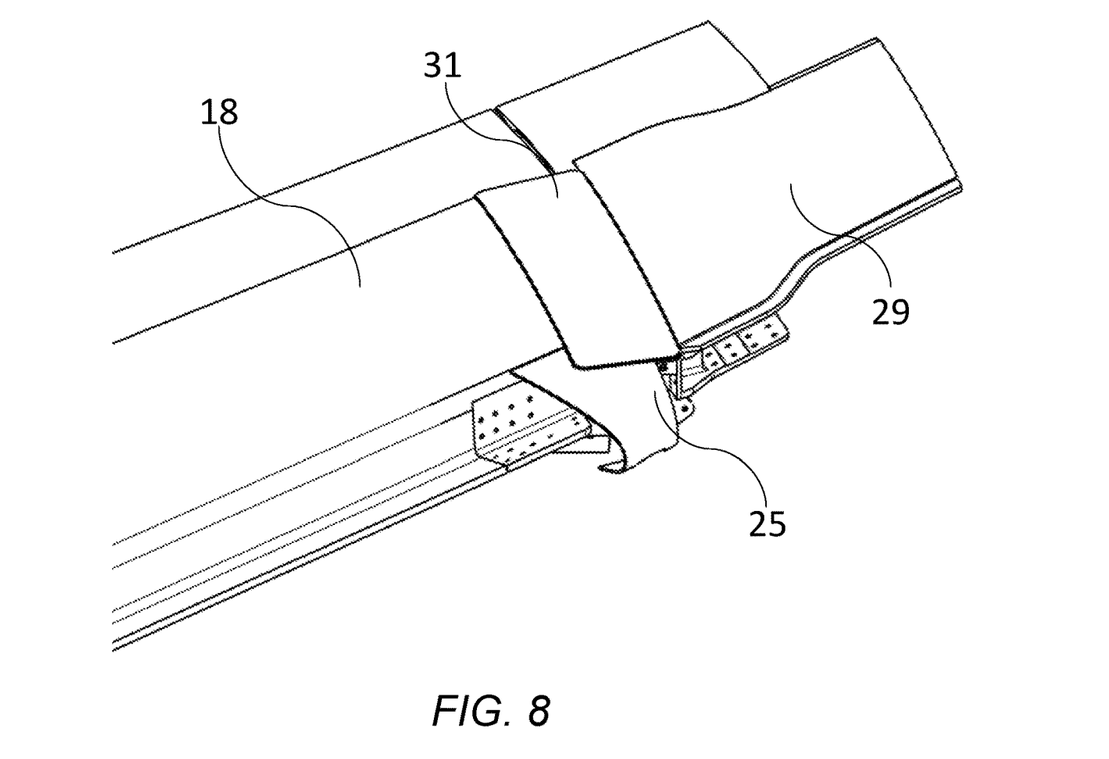

FIGS. 7 and 8 show an example of the aircraft wing 2 in a flight configuration. In the flight configuration, as shown in FIG. 8, the seal panel 31 may lie flush with the outer aerodynamic surface of the main wing portion 10 and the wing tip device 20. The seal panel 31 may be substantially parallel to the outer aerodynamic surface of the main wing portion 10 and the outer aerodynamic surface of the wing tip device 20.

The second end 33b of the first connecting element 32 may be inboard of the seal panel 31, wherein inboard refers to a spanwise position closer to the longitudinal axis of the aircraft 1. This defines the centre of rotation of the seal panel 31, and thereby helps to avoid clashing of the seal panel 31 with the main wing portion 10.

The main wing portion 10 may include a leading edge panel 25, as shown in FIG. 8. The leading edge panel 25 may extend across at least a portion of the spanwise extent of the seal panel 31. The leading edge panel 25 may extend over the rotatable coupling of the second end 33b of the first connecting element 32.

The first connecting element 32 may be elbow shaped, such that a first arm portion 42a and a second arm portion 42b meet at an elbow 43, so as to avoid clashing of the first connecting element 32 with the leading edge panel 25 when the seal panel assembly 30 is moved between the flight configuration and the ground configuration. The first arm portion 42a and the second arm portion 42b may be fixedly connected, such that there is no relative rotation between the first and second arm portions 42a, 42b. The first arm portion 42a may have a central axis angled with respect to a central axis of the second arm portion 42b. The angle shown in the example of FIGS. 7 and 8 is substantially 70 degrees, although the angle may be any suitable value. For example, the angle may be between 30 degrees and 150 degrees, and is preferably more than 100 degrees and less than 135 degrees. It will be appreciated that the most suitable angle for the elbow 43 will depend, at least partly, on the arrangement of the seal panel assembly 30.

Figure 9:
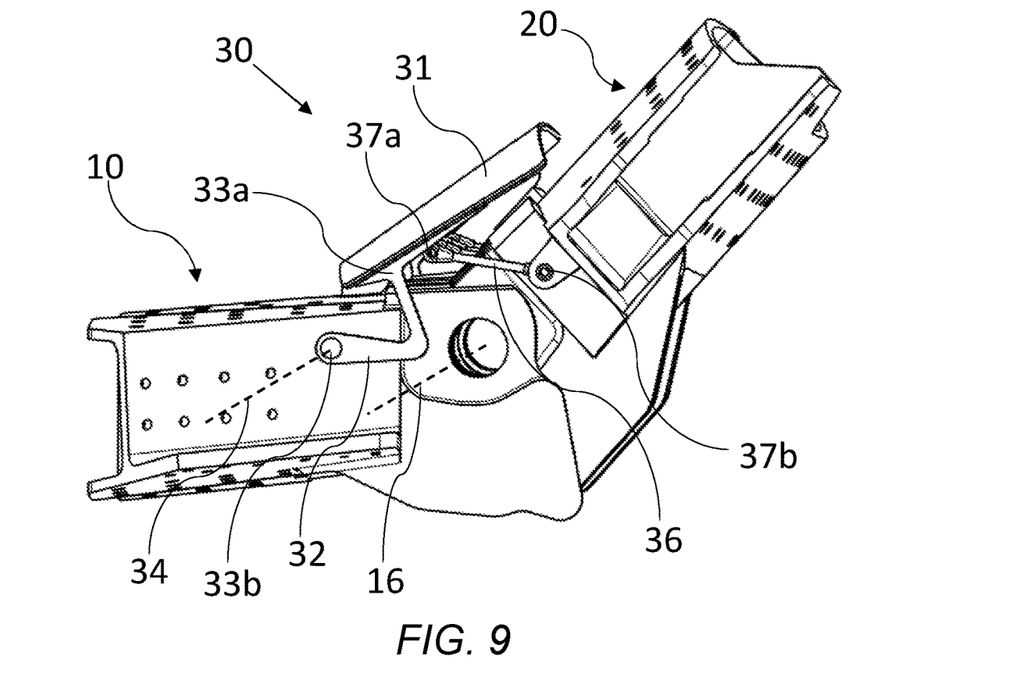
FIGS. 9 and 10 show the seal panel assembly of the aircraft wing in an intermediate configuration.
Figure 10:
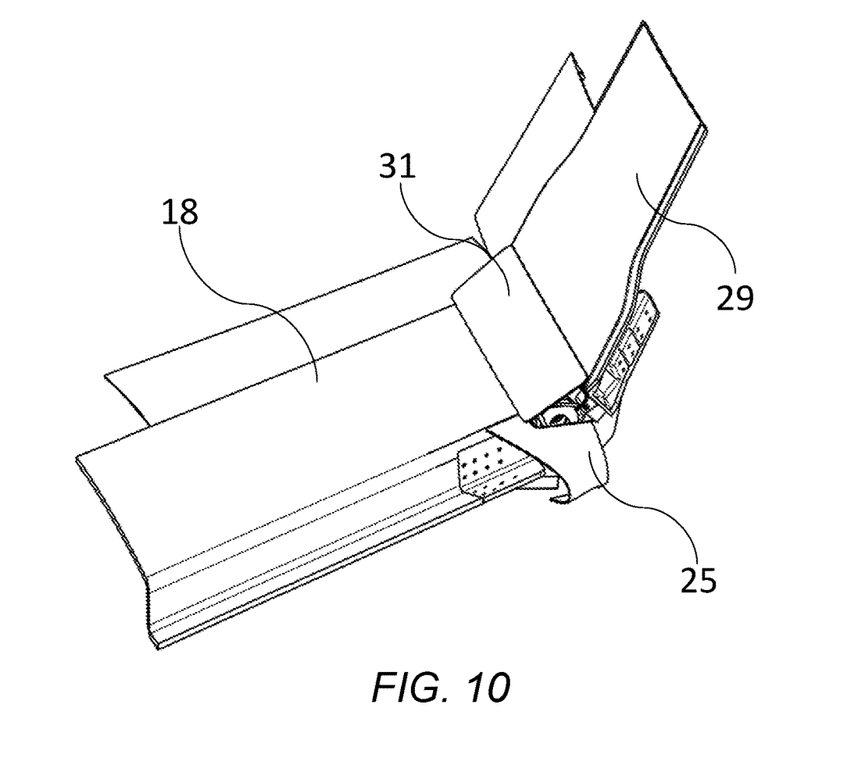

FIGS. 9 and 10 show an example of the aircraft wing 2 in an intermediate configuration between the flight configuration and the ground configuration. Specifically, FIGS. 9 and 10 show the wing tip device 20 rotated by approximately 45 degrees about the first axis 16 with respect to the position of the wing tip device 20 in the flight configuration.

It will be appreciated that the seal panel assembly 30 may comprise multiple first and second connecting elements 32, 36. The seal panel assembly 30 may include a different number of first connecting elements 32 to second connecting elements 36. The example shown in FIG. 9 includes two first connecting elements 32 and four second connecting elements 36. For the purposes of clarity, only one of the first connecting elements 32 and second connecting elements 36 is labelled in FIG. 9.

Due to the particular kinematics of the seal panel assembly 30, the seal panel 31 correspondingly rotates about the second axis 34. The seal panel 31 is rotatable in the same direction as the wing tip device 20, such that rotation of the wing tip device 20 in an anti-clockwise direction about the first axis 16 (when viewed from the front of the aircraft 1 or aircraft wing 2) is accompanied by a corresponding anti-clockwise rotation of the seal panel 31 about the second axis 34, and vice-versa. The seal panel 31 only rotates with the wing tip device 20, and in the same constant angular direction, such that the seal panel 31 rotates in a constant arc about the second axis 34.

However, it will be appreciated that the rotation speeds of the wing tip device 20 about the first axis 16 and the seal panel 31 about the second axis 34 may differ, such that the rotation of the wing tip device 20 by a first angle may be accompanied by rotation of the seal panel 31 by a second angle different to the second angle. In the example shown in FIGS. 9 & 10, the seal panel 31 has rotated less than the wing tip device 20. Specifically, the seal panel 31 is shown to have rotated approximately 35 degrees in the intermediate configuration although it will be appreciated that the term 'intermediate configuration' may refer to any position in between the flight and ground configurations.

It will be appreciated that the exact rotation of seal panel 31 depends on the length of the second connecting element 36, as well as the position of its two ends 37a, 37b. However, it has been realised that particular advantages are provided when the kinematics of the seal panel assembly 30 are such that the distance between the seal panel 31 and the outer surface of the wing tip device 20 are minimised during rotation between the flight configuration and the ground configuration. For examples, this may ensure that the seal panel 31 covers the first and second connecting elements 32, 36 during all rotation between the flight configuration and ground configuration. This arrangement may similarly protect other components within the joint 11, such as actuators or electrics.

The seal panel 31 is non-rotatably coupled to the first connecting element 32, with the first connecting element 32 rotatably coupled at its other end, i.e. the second end 33b.

This arrangement simplifies the movement of the seal panel 31, such that it rotates about a single axis, i.e. the second axis 34. In particular, this may ensure that once the seal panel assembly 30 is moved from the flight configuration, the seal panel 31 is angled downwardly towards the main wing portion 10 at all positions between the flight configuration and the ground configuration. This may allow any runoff from the seal panel 31 (e.g. residue/contaminants/de-icer on the seal panel 31) to fall towards the main wing portion 10, away from any components under the seal panel 31 such as actuators, or the remainder of the seal panel assembly 30. This can be particularly beneficial when the wing 2 has dihedral, as is the case in the present example.

It will be appreciated from FIGS. 9 and 10 that the elbow 43 in the first connecting element 32 assists in avoiding clashing of the first connecting element 32 with the leading edge panel 25. In particular, it will be appreciated from FIGS. 9 and 10 that the leading edge panel 25 may be located between the first end 33a of the first connecting element 32 and the second end 33b of the first connecting element 32, such that the elbow 43 assists in avoiding the first connecting element 32 clashing with the leading edge panel 25.

Figure 11:
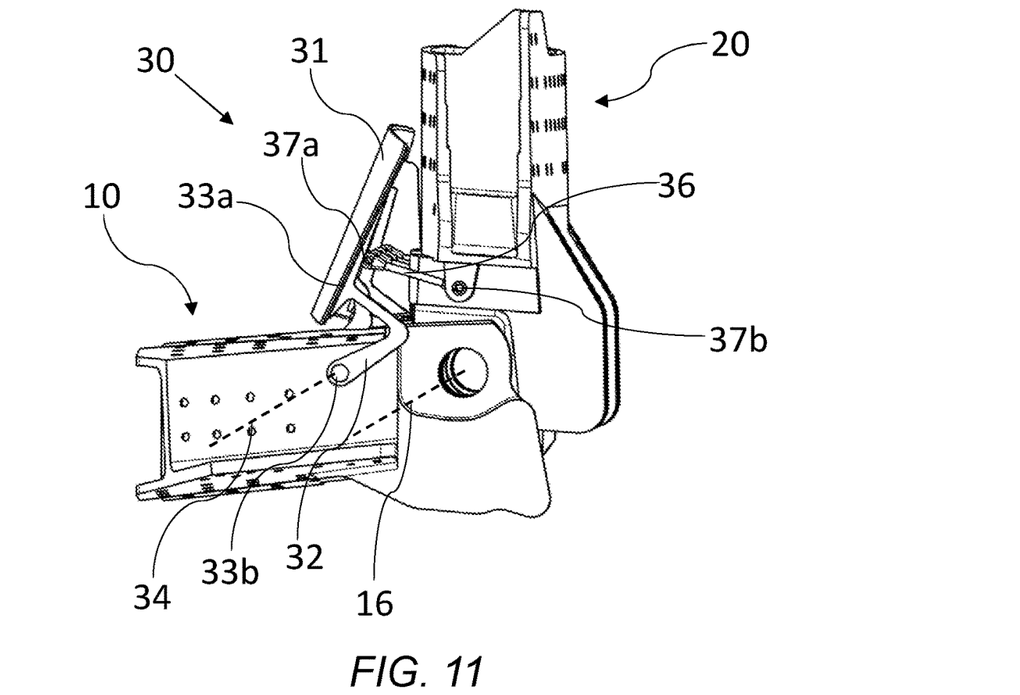
FIGS. 11 and 12 show the seal panel assembly of the aircraft wing in a ground configuration.
Figure 12:
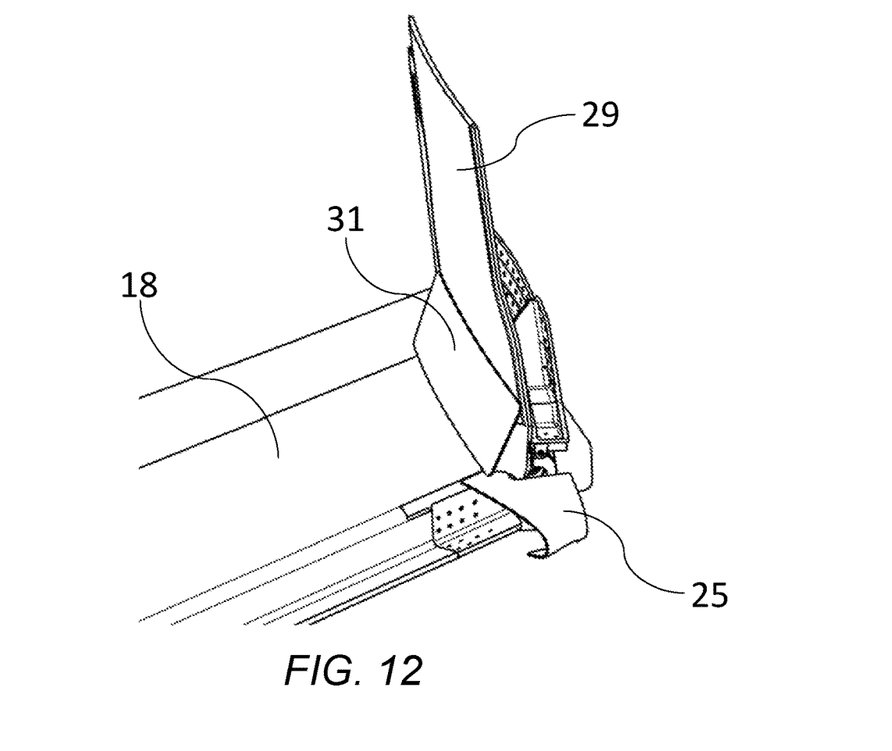

Further rotation of the wing tip device 20 about the first axis 16 results in the seal panel 31 correspondingly rotating about the second axis 34 towards a ground configuration, such as shown in FIGS. 11 and 12.

FIGS. 11 and 12 show the wing tip device 20 rotated by approximately 90 degrees with respect to the flight configuration, however it will be appreciated that the ground configuration may be any suitable angle with respect to the flight configuration, particularly in which the wing span of the aircraft 1 is reduced with respect to the flight configuration.

In the ground configuration, the seal panel 31 may be angled with respect to the surface of the main wing portion 10 and the surface of the wing tip device 20. In the example shown in FIGS. 7 to 12, the seal panel assembly 30 is configured to maintain the seal panel 31 at an angle to the surface of the main wing portion 10 that is less than the angle between the surface of the wing tip device 20 and the surface of the main wing portion 10.

The angle between the seal panel 31 and the surface of the main wing portion 10 shown in FIG. 12 is approximately 65 degrees, whilst the surface of the wing tip device 20 is angled with respect to the surface of the main wing portion 10 by approximately 90 degrees, such that the angle between the surface of the wing tip device 20 and the seal panel 31 is approximately 25 degrees, although it will be appreciated that the respective angles may be any suitable values.

In some examples, the angle between the surface of the wing tip device 20 and the seal panel 31 may be anything between 5 degrees and 85 degrees. The angle between the surface of the wing tip device 20 and the seal panel 31 is preferably between 20 degrees and 45 degrees.

The seal panel assembly 30 avoids the need for a more complicated arrangement for passively (or actively) moving the seal panel 31 between the flight and ground configurations. There is no need for a complicated linkage arrangement, and instead the seal panel assembly 30 may be connected to the main wing portion 10 at only a single point (i.e. the second end 33b of the first connecting element 32) and connected to the wing tip portion 20 at only a single point (i.e. the second end 37b of the second connecting element 36).

Passive actuation of the seal panel assembly 30, using the existing movement of the wing tip device 20, allows the use of more complicated mechanisms and additional actuators to be avoided. As a result, a simplified and more reliable way of moving the seal panel 31 may be provided.

FIGS. 13 to 16 show an example substantially similar to the example shown in relation to FIGS. 7 to 12, with the addition of a side panel 46.

Figure 13:
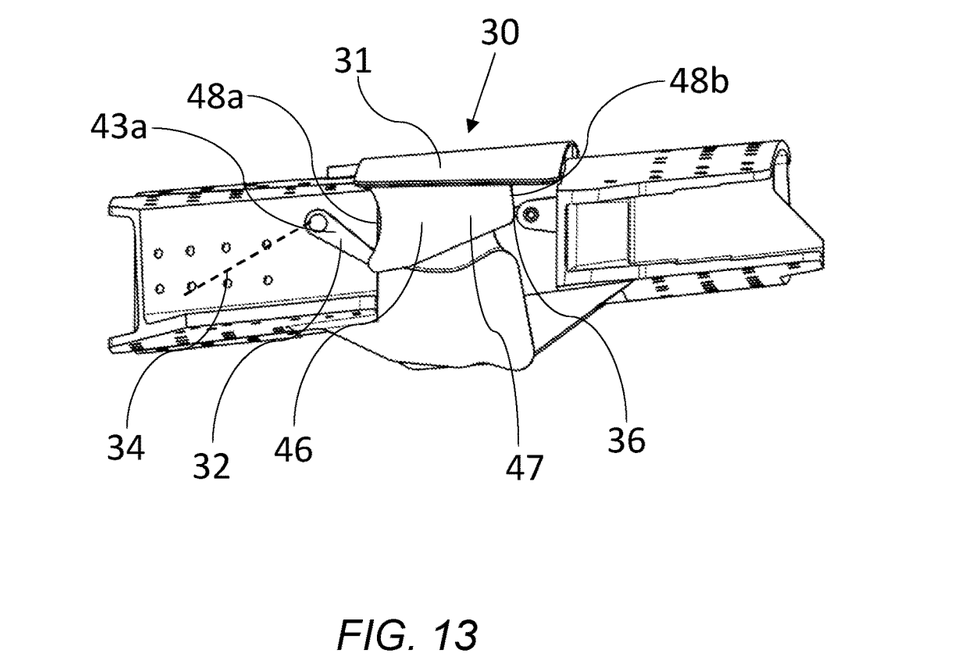
FIG. 13 shows a seal panel assembly in a flight configuration and comprising a side panel.
Figure 14:
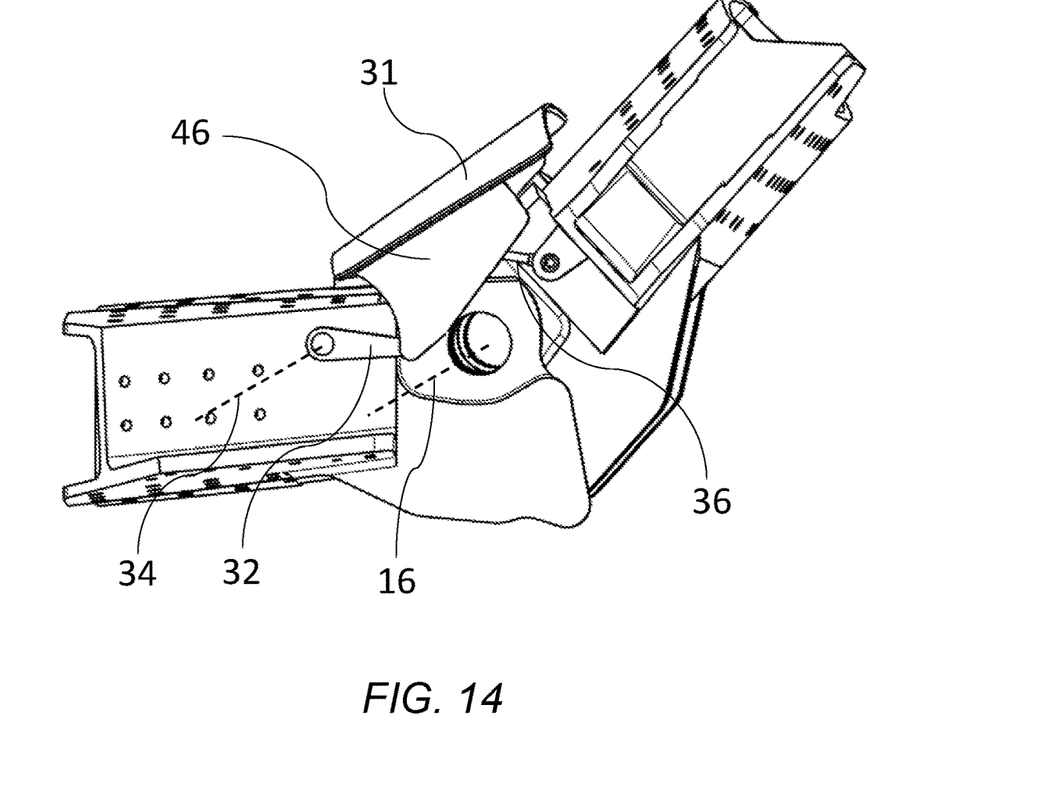
FIG. 14 shows the seal panel assembly in an intermediate configuration.

The side panel 46 may be coupled to the seal panel 31 and/or may be coupled to the first connecting element 32. The side panel 46 may include a face portion 47 substantially perpendicular to the second axis 34.

Figure 15:
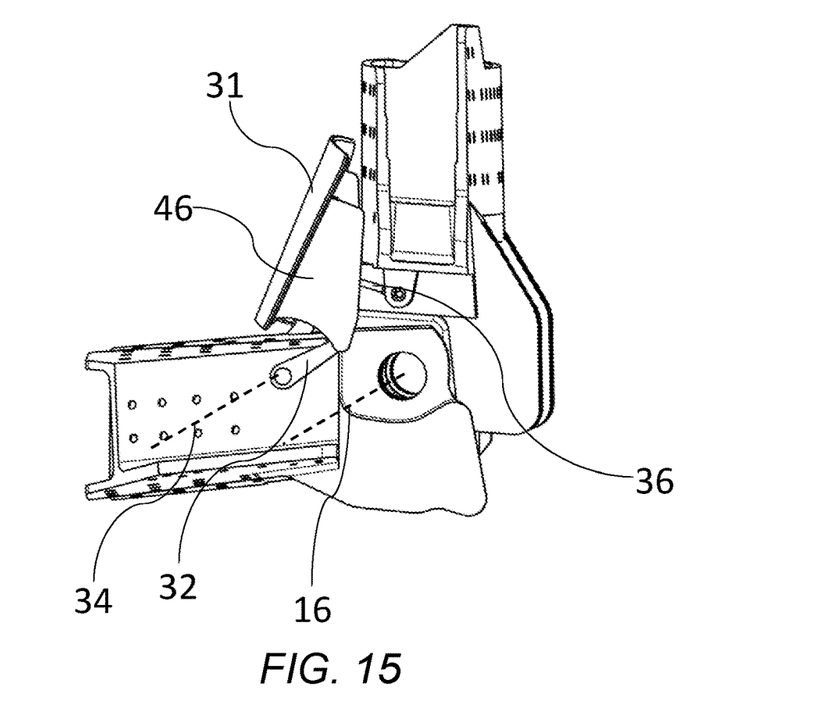
FIG. 15 shows the seal panel assembly in a ground configuration.

The side panel 46 may be configured to extend over at least a portion of the first and second connecting elements 32, 36 in both the flight configuration and the ground configuration. In this way, the side panel 46 may protect the first and second connecting elements 32, 36. This may be particularly advantageous in the ground configuration, where the first and second connecting elements 32, 36 would otherwise be exposed to the external environment when viewed fore or aft of the seal panel assembly 30, i.e. when viewed in a direction substantially parallel to the longitudinal axis of the aircraft 1. In the flight configuration, the side panel 46 extends into the existing wing structure and is hidden from view on the external surface on the wing 1.

The side panel 46 may be shaped so as to maximise the coverage and protection that the side panel 46 may provide to the seal panel assembly 30, whilst avoiding clashing of the side panel 46 with the main wing portion 10 and wing tip device 20.

The side panel 46 may have a first edge 48a. The first edge 48a may be arcuate. The first edge 48a is an edge adjacent the main wing portion 10, i.e., an inboard edge. The side panel 46 may include a second edge 48b adjacent the wing tip device 20, i.e. an outboard edge.

The first edge 48a may be a circular arc. The radius of the circular arc may be substantially the same as the length of the first arm portion 43a, i.e. within 5-10% of the length of the first arm portion 43a, so as to minimise the clearance between the first edge 48a and the surface of the main wing portion 10 whilst avoiding undesirable contact with the main wing portion 10 during movement from the flight configuration (FIG. 13), to the intermediate configuration (FIG. 14), to the ground configuration (FIG. 15).

The second edge 48b may be similarly shaped to minimise the clearance between the second edge 48b and the surface of the wing tip device 20, whilst avoiding contact with the wing tip device 20.

Figure 16:
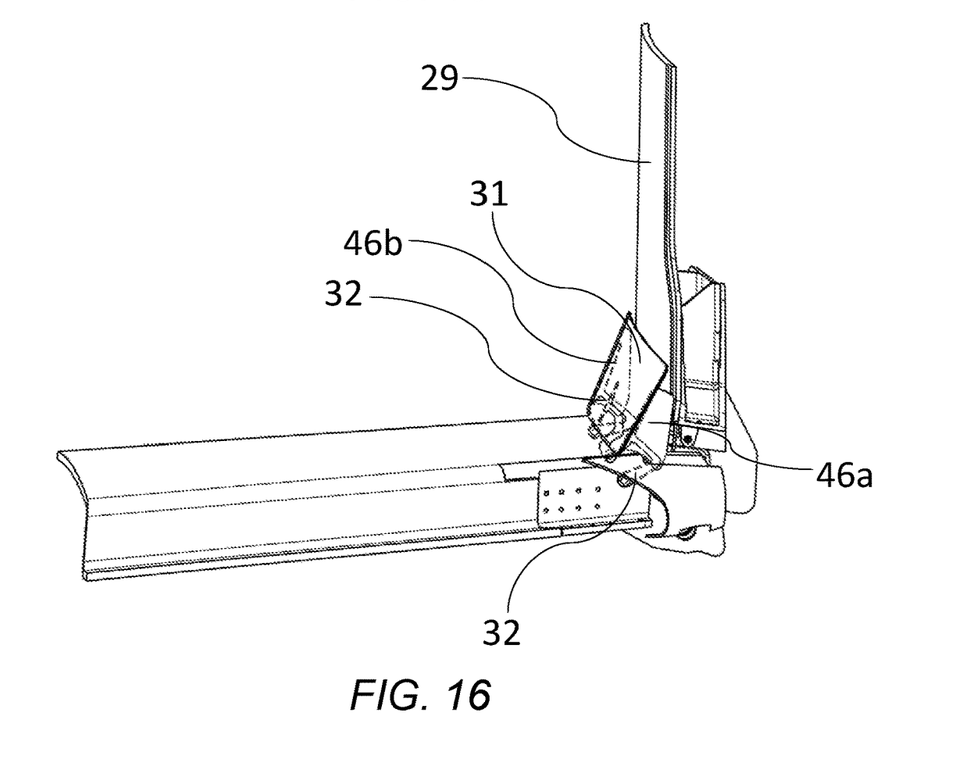
FIG. 16 shows a second side panel of the seal panel assembly.

In some examples, the seal panel assembly 30 may comprise first and second side panels 46a, 46b. FIG. 16 shows an example in which a first side panel 46a is located towards a first end of the joint 11 (e.g. towards a leading edge of the wing 2) and a second side panel 46b is located towards a second end of the joint 11 (e.g. towards a trailing edge of the wing 2). In this way, the joint 11 and any other components (such as actuators and the like) may be protected by the side panels 46a, 46b.

In some examples, the first connecting element 32 and second connecting element 36 may be located between the first and second side panels 46a, 46b. FIG. 16 shows such an example. By locating the first connecting element 32 and second connecting element 36 between the first and second side panels 46a, 46b, the connecting elements 32, 36 may be protected by the side panels 46a, 46b.

It will be clear to the skilled person that the examples described above may be adjusted in various ways.

In above-described examples, the aircraft wing 2 has a leading edge and a trailing edge, and the seal panel 31 extends the majority of the distance between the leading and trailing edges (e.g. 60-70%). This allows the seal panel 31 to extend over the entire joint 11 between the main wing portion 10 and the wing tip device 20.

In alternative examples, the seal panel 31 may extend over less of the distance between the leading and trailing edges.

Figure 17:
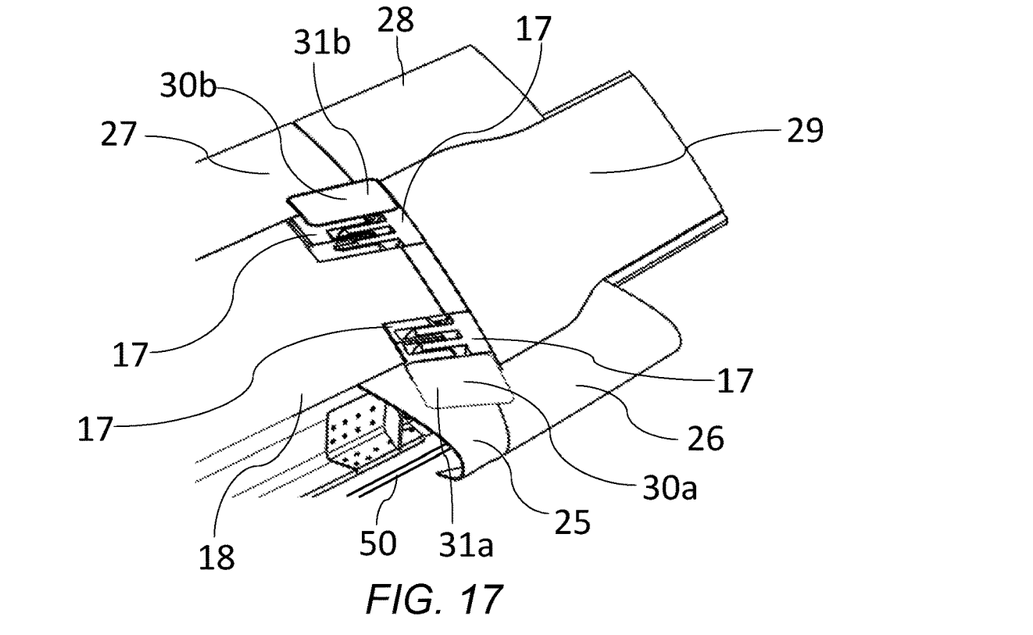
FIGS. 17 and 18 show a further example of a folding aircraft wing comprising two seal panel assemblies.
Figure 18:
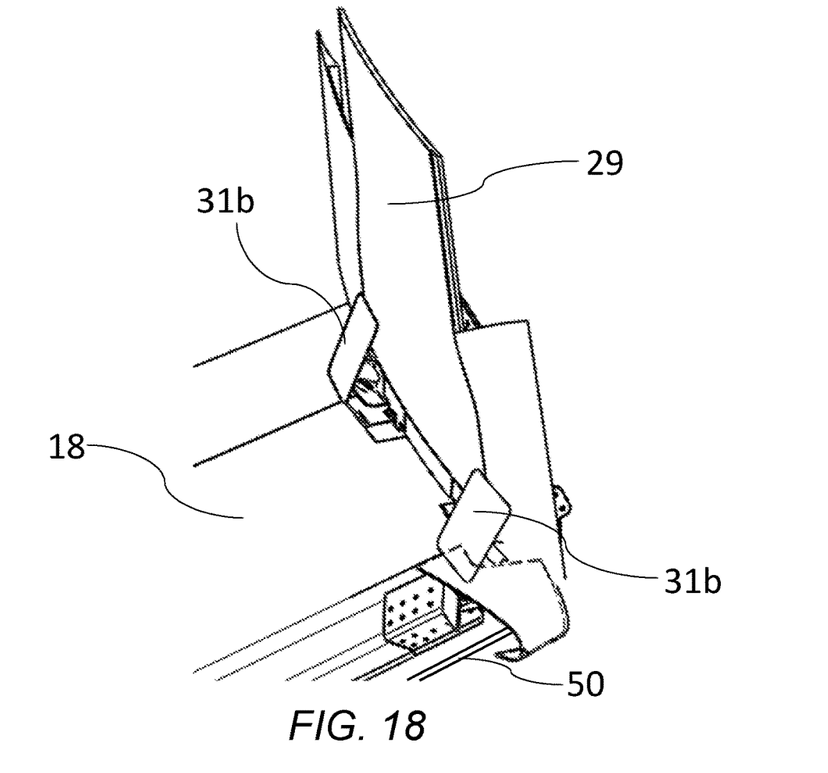

In some examples, there may be a plurality of seal panel assemblies 30a, 30b that each extend over a different portion of the joint 11. FIGS. 17 and 18 show an example in which a first seal panel 31a of a first seal panel assembly 30a extends over a first portion of the joint 11 and a second seal panel 31b of a second seal panel assembly 30b extends over a second portion of the joint 11.

In some examples, the seal panels 31, 31a, 31b do not extend across the lugs 17 or at least only extend over a portion of the lugs 17. In such examples, the seal panels 31a, 31b may be utilised to protect other systems of the wing 2 and/or to provide access to such systems.

In the example shown in FIGS. 17 and 18, the first seal panel 31a extends across a portion of the leading edge panel 25 of the main wing portion 10 and a leading edge panel of the wing tip device 26. Similarly, the second seal panel 31b extends across a portion of the trailing edge panel 27 of the main wing portion 10 and a trailing edge panel 28 of the wing tip device 20.

A power system 50 (e.g. an electrical harness) is shown to extend adjacent the leading edge of the wing 2 and within the space between the leading edge panels 25, 26 and the wing box of the wing 2. A similar power system 50 may be located adjacent the trailing edge within a space between the trailing edge panels 27, 28 and the wing box of the wing 2.

By providing a seal panel assembly 30, 30a, 30b across the joint 11 adjacent to the power systems 50 (such that the power systems 50 are at approximately the same chordwise and spanwise positions on the wing 2), the seal panel(s) 31, 31a, 31b may be removed to provide access to the power systems 50. This can assist in the installation, inspection and repair of the power systems 50.

It will be appreciated that the seal panel assembly 30, 30a, 30b and associated seal panel 31, 31a, 31b may extend across the lugs 17 and/or power systems 50 (such that the lugs 17 and/or power systems 50 are at approximately the same chordwise and spanwise positions on the wing 2), or any other part of the joint 11. This may include a single seal panel 31, such as described in the examples relating to FIGS. 7 to 16, or may include two or more seal panels 31a 31b that each extend across respective portions of the joint 11. It will be appreciated that there may be any arrangement and any number of the seal panel assemblies 30, 30a 30b and associated seal panels 31, 31a, 31b.

In some examples, the seal panel assembly 30, 30a, 30b may comprise multiple first and second connecting elements 32, 36, such as two, three or more. This may assist in supporting the seal panel 31, 31a, 31b.

It will be appreciated that, whilst the examples describe joint 11 arranged such that the wing tip device 10 is rotated upwardly when moved to the ground configuration, the joint 11 may be such that the wing tip device is rotated downwardly when moved to the ground configuration. In such examples, the seal panel 31, 31a, 31b may alternatively cover a lower surface of the wing 2.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both, unless the this application states otherwise. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft wing comprising:
a main wing portion with a tip end;
a wing tip device rotatably coupled to the tip end of the main wing portion at a joint, the wing tip device rotatable at the joint about a first axis between a flight configuration and a ground configuration; and
a seal panel assembly comprising:
a seal panel extending across the joint, wherein the seal panel includes an edge oriented in a chordwise direction of the main wing portion and overlapping the main wing portion while the wing tip device is in a flight configuration;
a first connecting element including a first end non-rotatably coupled to the seal panel and a second end rotatably coupled to the main wing portion, such that the seal panel is rotatable about a second axis, wherein the second axis is offset from the edge towards a root of the main wing portion in a spanwise direction of the main wing portion while the wing tip device is in the flight configuration; and
a second connecting element including a first end rotatably coupled to the seal panel and a second end rotatably coupled to the wing tip device, such that rotation of the wing tip device about the first axis causes the seal panel to rotate about the second axis.

2. The aircraft wing of claim 1, wherein the first axis and the second axis are substantially parallel, and the seal panel and wing tip device are configured to rotate in the same direction.

3. The aircraft wing of claim 1, wherein the second end of the first connecting element is inboard of the seal panel.

4. The aircraft wing of claim 1, wherein the first connecting element comprises a first arm portion which includes the first end directly attached to the seal panel along a length of the first arm portion, and a second arm portion which includes the second end, and wherein the first arm portion and the second arm portion meet at an elbow.

5. The aircraft wing of claim 4, wherein a central axis of the first arm portion extends at an angle less than 135 degrees with respect to a central axis of the second arm portion.

6. The aircraft wing of claim 1, wherein the seal panel has a perimeter edge including the edge, and substantially an entirely of the perimeter edge overlaps one of an outer skin of the main wing portion and an outer skin of the wing tip device, while the wing tip device is in a flight configuration.

7. The aircraft wing of claim 1, further comprising a seal configured to seal a gap between the seal panel and a surrounding structure of the main wing portion while the wing tip device in a flight configuration, wherein the seal extends along substantially an entire perimeter of the seal panel.

8. The aircraft wing of claim 1, further comprising a power system extending across the joint at a chordwise position, wherein the seal panel assembly is located at a chordwise position of the power system extending across the joint such that the seal panel is arranged to cover the power system.

9. The aircraft wing of claim 1, wherein the wing tip device is rotatable coupled to the main wing portion by a plurality of lugs, and wherein the seal panel assembly is located at a chordwise position of the lugs such that the seal panel covers the plurality of lugs.

10. The aircraft wing of claim 1, wherein the seal panel assembly is a first seal panel assembly arranged to cover a first portion of the joint, and the aircraft wing comprises a second seal panel assembly arranged to cover a second portion of the joint.

11. The aircraft wing of claim 1, wherein the seal panel extends across the joint on an upper surface of the aircraft wing.

12. An aircraft comprising the aircraft wing of claim 1.

13. An aircraft wing comprising:
a main wing portion with a tip end;
a wing tip device rotatably coupled to the tip end of the main wing portion at a joint, the wing tip device rotatable at the joint about a first axis between a flight configuration and a ground configuration; and
a seal panel assembly comprising:
  a seal panel extending across the joint;
  a first connecting element including a first end non-rotatably coupled to the seal panel and a second end rotatably coupled to the main wing portion, such that the seal panel is rotatable about a second axis;
  a second connecting element including a first end rotatably coupled to the seal panel and a second end rotatably coupled to the wing tip device, such that rotation of the wing tip device about the first axis causes the seal panel to rotate about the second axis, and
  a side panel including a face portion substantially perpendicular to the first axis, wherein the side panel is configured to extend over at least a portion of the first connecting element and the second connecting element while the wing tip device is in a ground configuration.

14. The aircraft wing of claim 13, wherein an inboard edge of the side panel is arcuate.

15. The aircraft wing of claim 13, wherein the side panel is a first side panel located towards a first end of the joint, and the seal panel includes a second side panel located towards a second end of the joint.

16. The aircraft wing of claim 15, wherein the first connecting element and the second connecting element are located between the first side panel and the second side panel.

* * * * *